US012778078B2

(12) United States Patent
Caron et al.

(10) Patent No.: US 12,778,078 B2
(45) Date of Patent: Nov. 3, 2026

(54) BAG OF WET PET FOOD

(71) Applicants: YOPI, Rouen (FR); CEVA SANTE ANIMALE, Libourne (FR)

(72) Inventors: Pierre Caron, Paris (FR); Yoan Pochet, Paris (FR)

(73) Assignees: YOPI, Rouen (FR); CEVA SANTE ANIMALE, Libourne (FR)

( * ) Notice: Subject to any disclaimer, the term of this patent is extended or adjusted under 35 U.S.C. 154(b) by 0 days.

(21) Appl. No.: 18/868,637

(22) PCT Filed: May 23, 2023

(86) PCT No.: PCT/EP2023/063855
§ 371 (c)(1),
(2) Date: Nov. 22, 2024

(87) PCT Pub. No.: WO2023/227638
PCT Pub. Date: Nov. 30, 2023

(65) Prior Publication Data

US 2025/0318501 A1 Oct. 16, 2025

(30) Foreign Application Priority Data

May 23, 2022 (FR) ....................................... 2204927

(51) Int. Cl.
*A01K 5/02* (2006.01)
*A01K 5/01* (2006.01)

(52) U.S. Cl.
CPC .......... *A01K 5/0275* (2013.01); *A01K 5/0114* (2013.01)

(58) Field of Classification Search
CPC ................................ B65D 35/40; B65D 35/28
See application file for complete search history.

(56) References Cited

U.S. PATENT DOCUMENTS

| | | | | |
|---|---|---|---|---|
| 2,962,192 A * | 11/1960 | Volckening ........ | B65D 75/5811 222/541.6 |
| 4,452,378 A * | 6/1984 | Christine ........... | B65D 75/5883 383/125 |

(Continued)

FOREIGN PATENT DOCUMENTS

| | | |
|---|---|---|
| WO | 01/17892 A2 | 3/2001 |
| WO | 2017/020038 A1 | 2/2017 |
| WO | 2018/183726 A1 | 10/2018 |

OTHER PUBLICATIONS

PCT Search Report and Written Opinion dated Sep. 8, 2023 for related PCT Patent Application No. PCT/EP2023/063855, filed May 23, 2023, 13 pages.

*Primary Examiner* — Derek J Battisti
(74) *Attorney, Agent, or Firm* — Hovey Williams LLP; Paul J. Walker

(57) ABSTRACT

The invention relates to a bag of wet pet food (4), the bag (4) being formed by two walls connected to each other over a portion (28A) of the periphery (28) thereof and defining therebetween a volume for receiving wet food, the two walls not being connected to each other over another portion (28B) of the periphery (28) thereof, and being configured to form a neck (26) for opening the bag (4) at this other portion (28B), the neck (26) being deformable between an open position and a closed position. The walls of the bag (4) comprise, on their internal face, one or more internal weld(s) (30) connecting the walls to each other inside the bag (4), said the internal weld(s) (30) being connected to each other to form, inside the bag (4), a funnel (32) in fluid communication with the opening neck (26) of the bag (4).

13 Claims, 8 Drawing Sheets

(56) References Cited

U.S. PATENT DOCUMENTS

| | | | | | |
|---|---|---|---|---|---|
| 4,564,127 | A * | 1/1986 | Garabedian | A47K 5/1215 222/105 |
| 5,000,350 | A * | 3/1991 | Thomsen | B65D 47/2031 222/491 |
| 5,067,635 | A * | 11/1991 | Thomsen | B65D 35/28 222/491 |
| 5,333,758 | A * | 8/1994 | Jamison | B65D 75/5822 222/491 |
| 7,658,542 | B2 * | 2/2010 | Risgalla | B65D 75/5822 383/44 |
| 2017/0027222 | A1 * | 2/2017 | Sinclair, Jr. | B65B 29/10 |
| 2020/0354550 | A1 * | 11/2020 | Takeuchi | B65D 35/40 |

* cited by examiner

[Fig. 1]
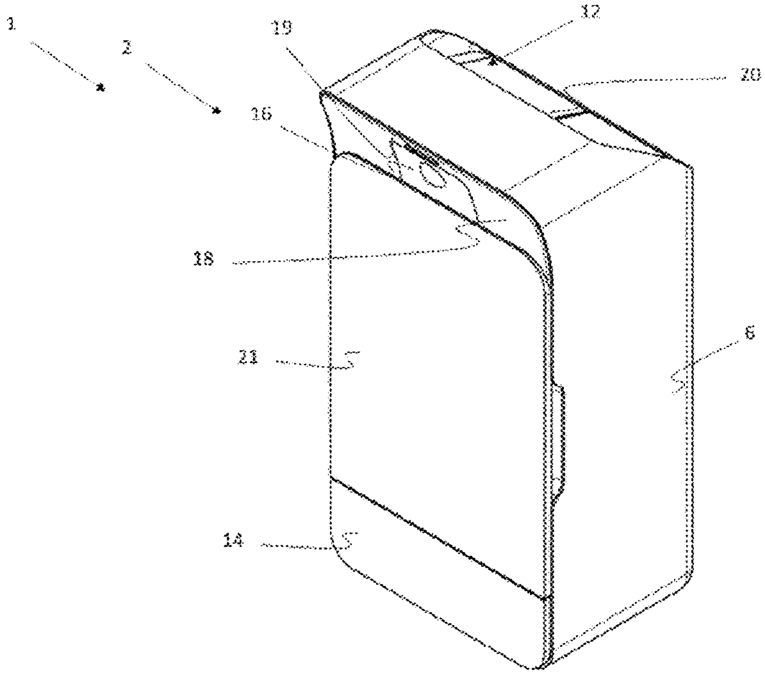
[Fig. 2]
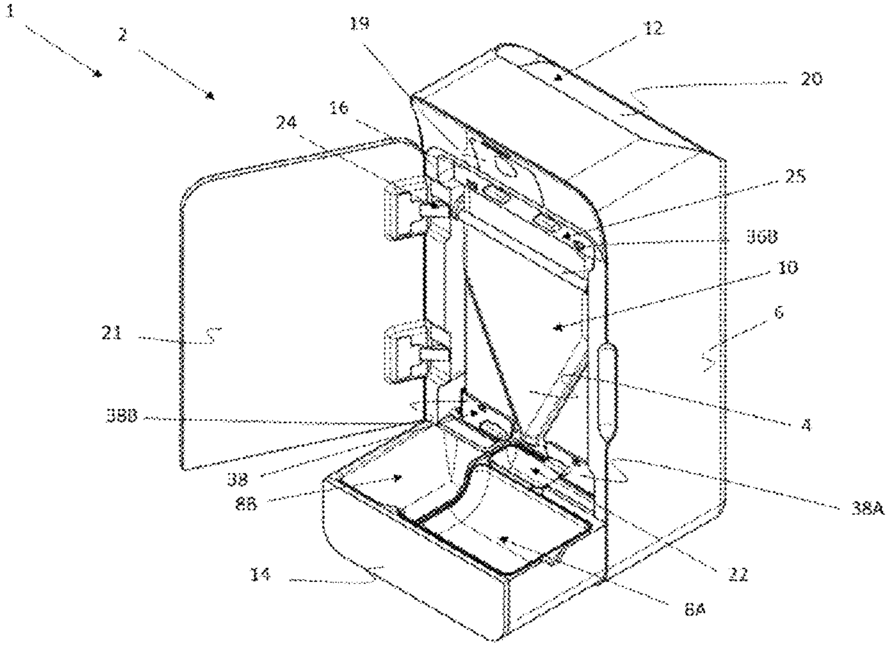

[Fig. 3]
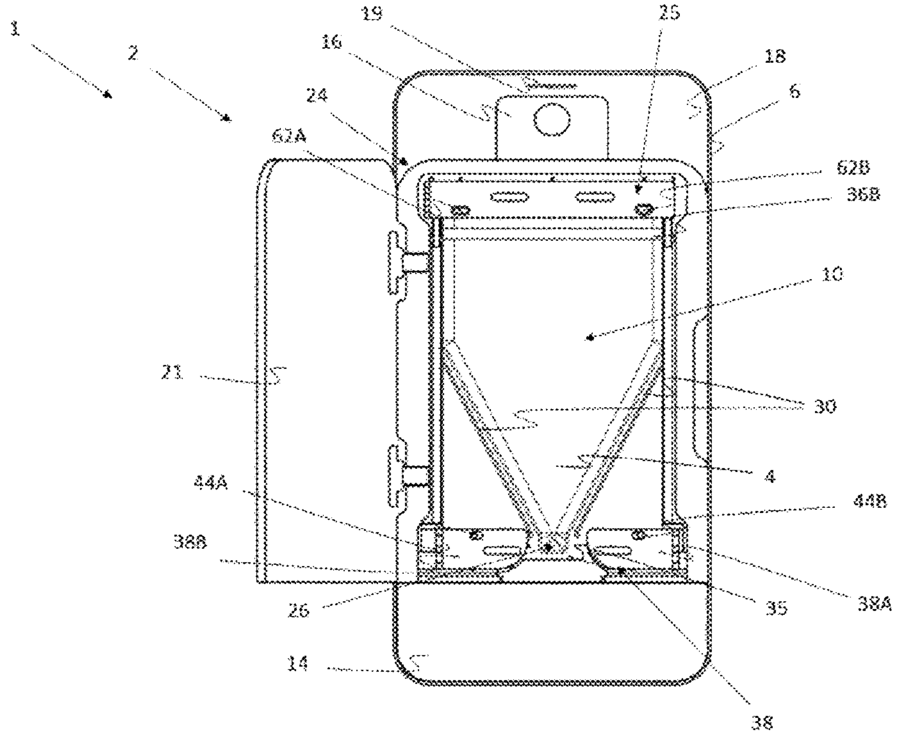
[Fig. 4]
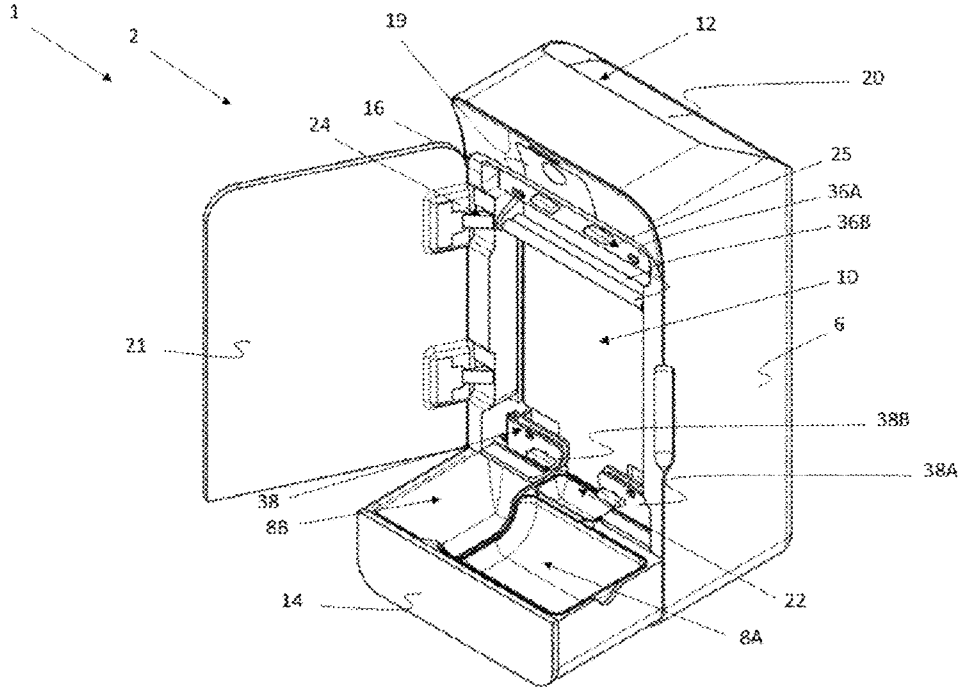

[Fig. 5]
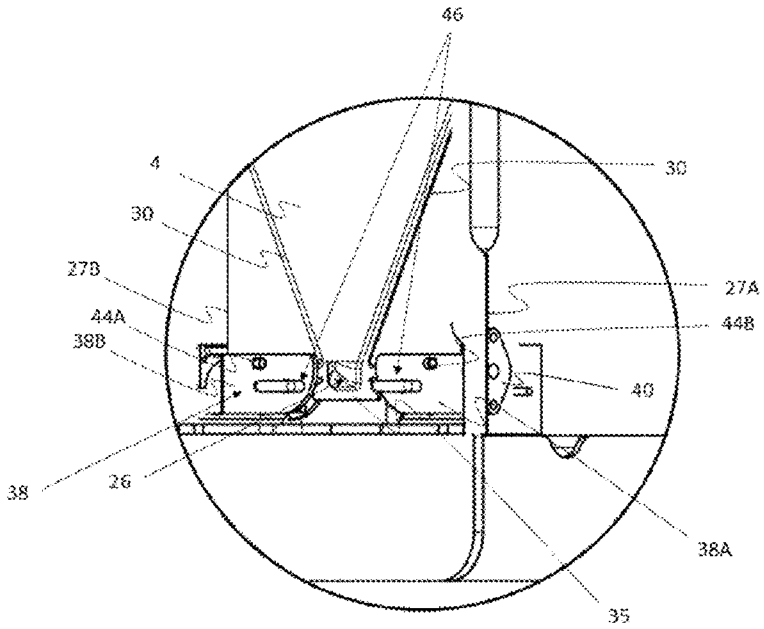
[Fig. 6]
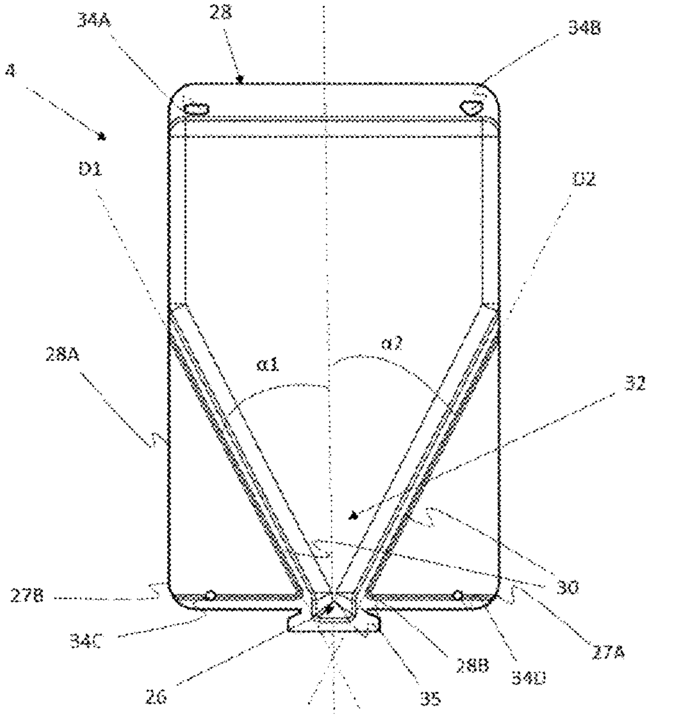

[Fig. 7]
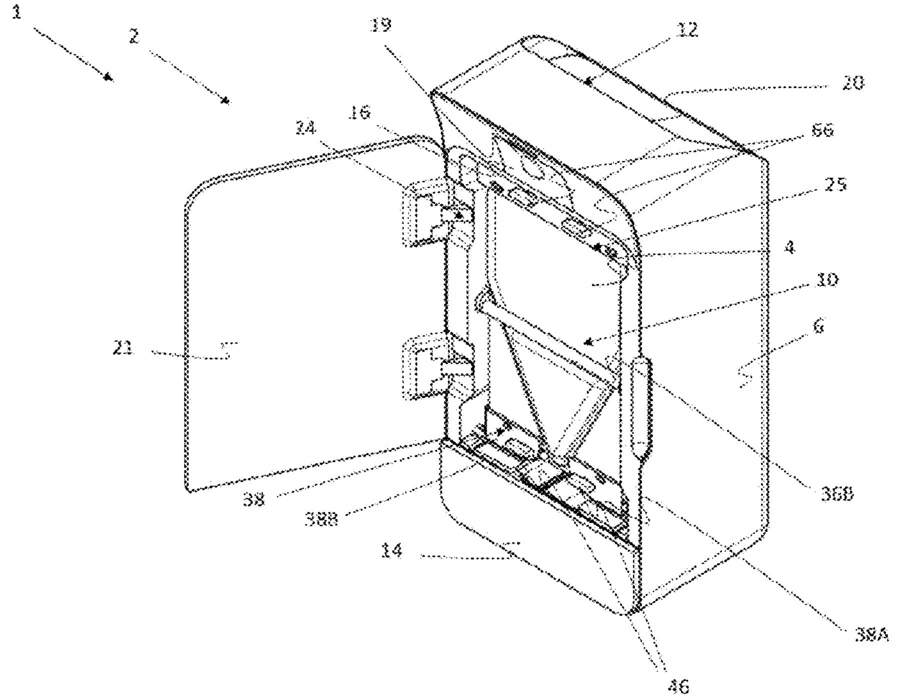
[Fig. 8]
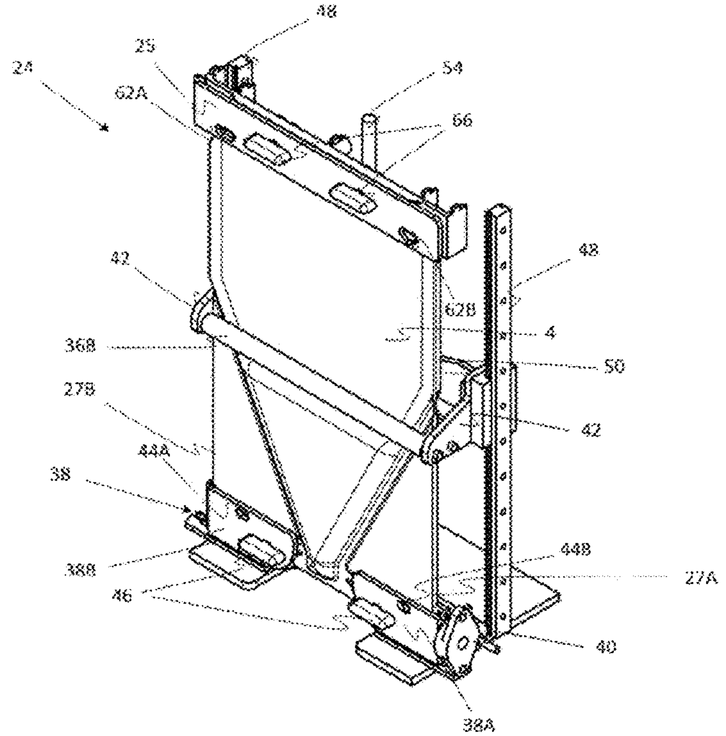

[Fig. 9]
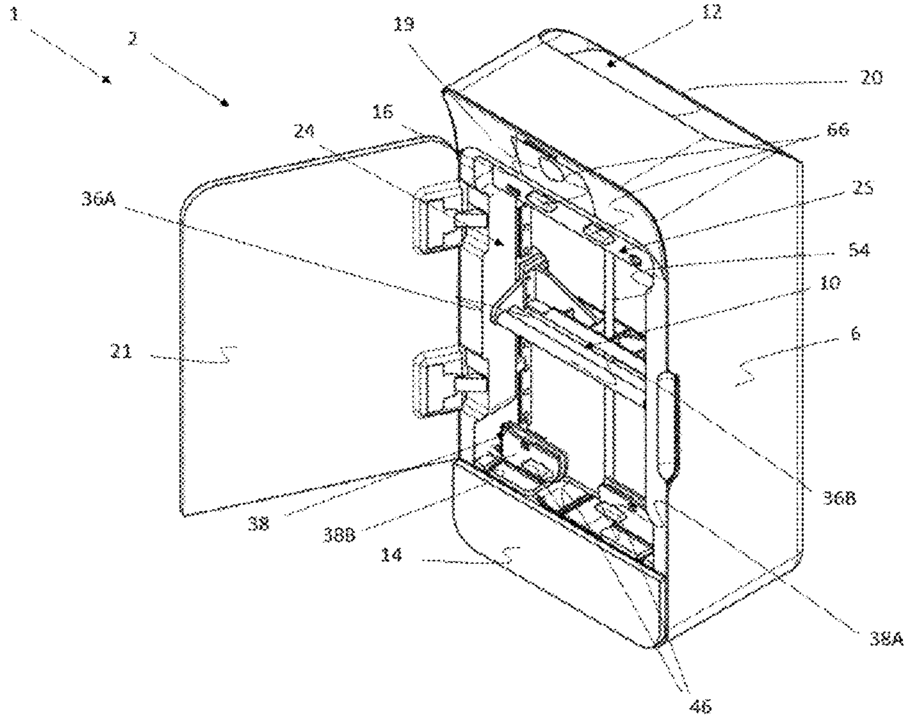
[Fig. 10]
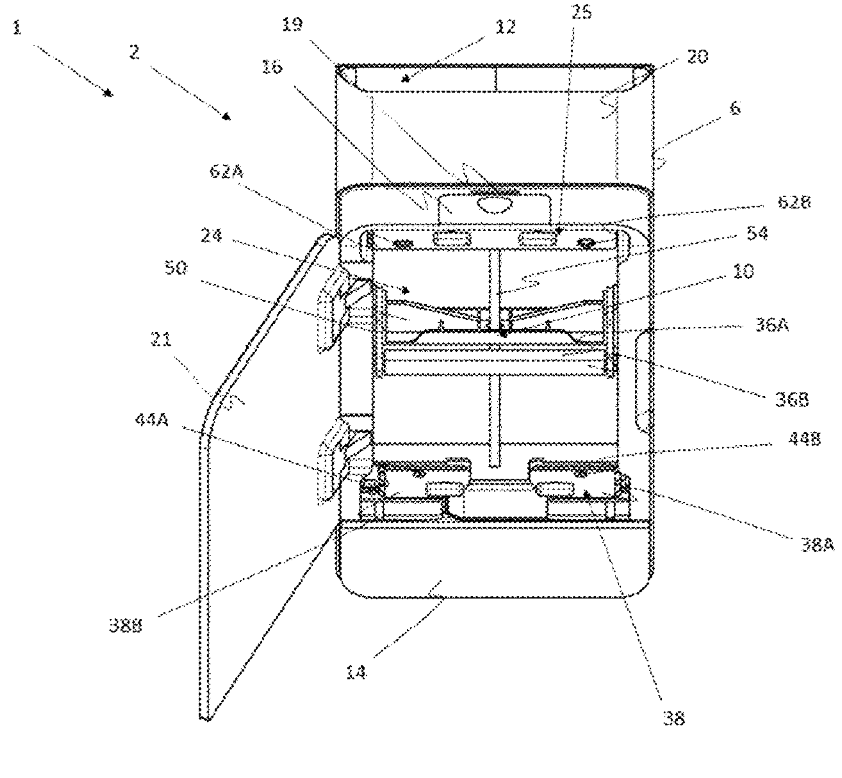

[Fig. 11]
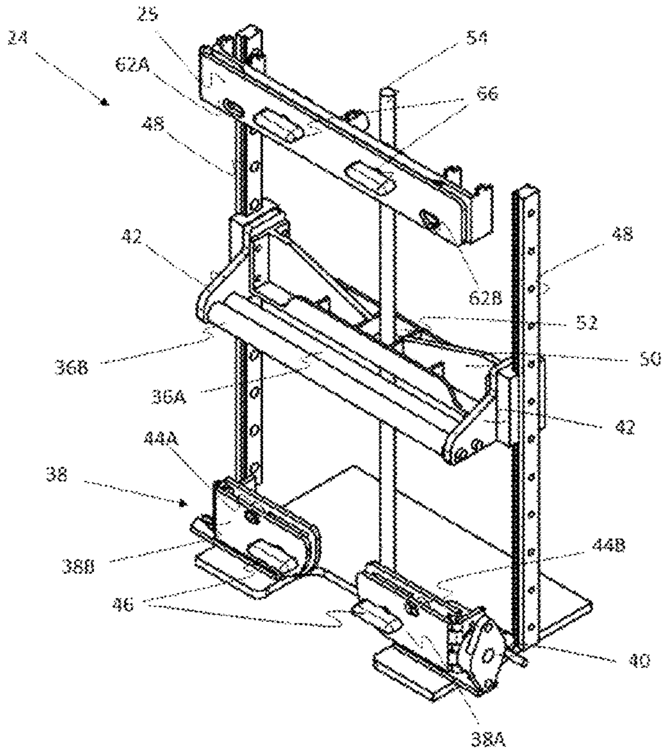
[Fig. 12]
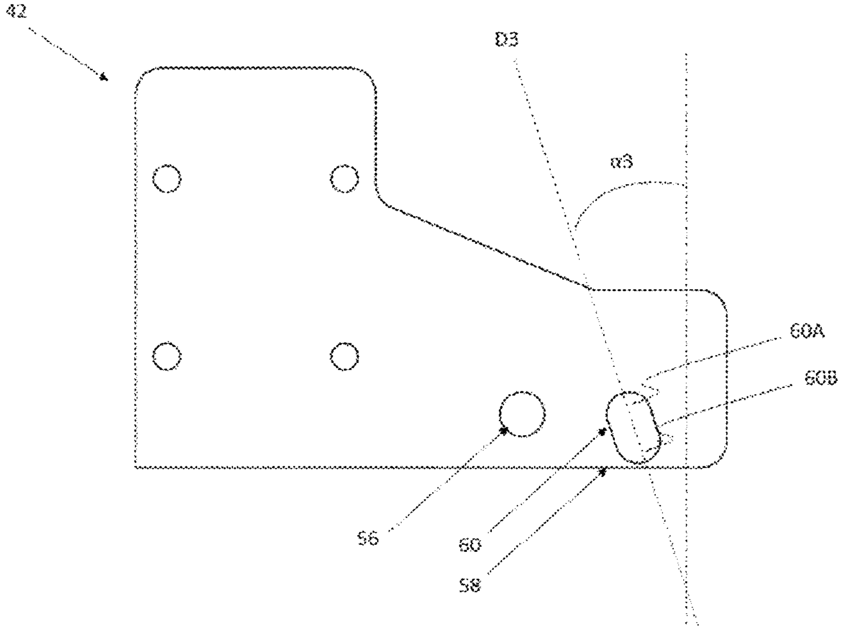

[Fig. 13]
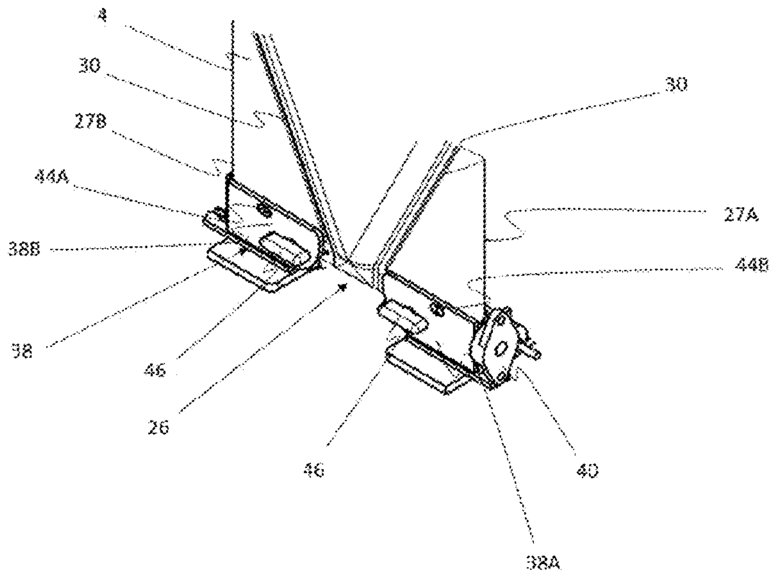
[Fig. 14]
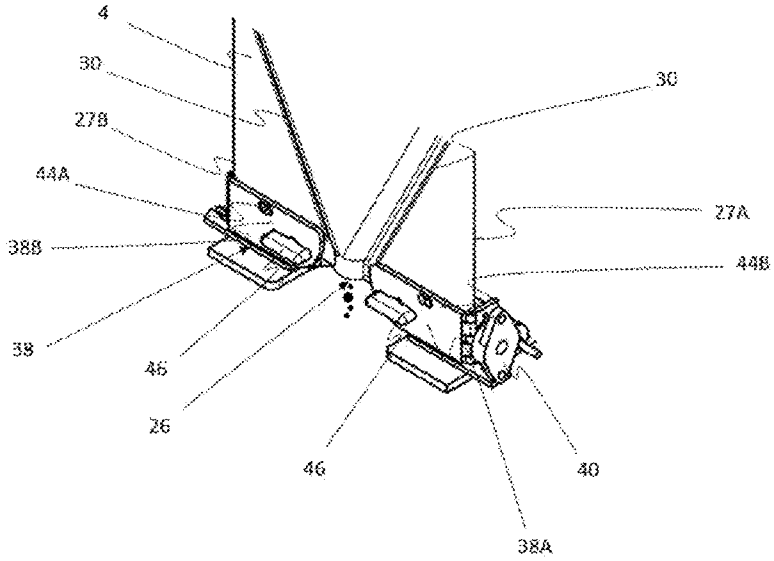

BAG OF WET PET FOOD

RELATED APPLICATIONS

This application is a national stage application, under 35 U.S.C. § 371 of International Patent Application No. PCT/EP2023/063855, filed on May 23, 2023, and published as WQ 2023/227638 A1 on Nov. 30, 2023, which claims priority to French Patent No. FR2204927, filed May 23, 2022, which are hereby incorporated by reference in their entirety.

The invention relates to the field of bags of wet pet food, typically for small pets such as cats or dogs. Wet food includes (but is not limited to) paté food. The invention also relates to an assembly comprising such a bag of wet food and a device for dispensing food within which the bag is installed.

In the field of devices for dispensing pet food, food receptacles are known which control the animal's access to wet food. For example, prior art solutions consist in equipping the animal (e.g. a cat) with a microchip, typically worn on a collar around the animal's neck or via an intradermal chip. The receptacle is fitted, for example, with a movable lid that prevents access to food when closed. The receptacle is equipped with electronic control means for opening the lid, as well as chip recognition means (e.g. a detection hoop) connected to the control means. In this way, the animal fitted with the chip and approaching the receptacle controls the opening of the lid, thus freeing access to the wet food. However, a disadvantage of this type of receptacle is that it requires manual refilling by the user each time food is dispensed. Additionally, once wet food has been removed from its packaging, even when protected from the ambient air, it oxidizes in around four to eight hours.

There is therefore a need to be able to dispense wet food (such as paté) automatically and repeatedly, making it easier for the user to go about his business while meeting the animal's nutritional requirements. For this purpose, dispensers are known which automatically deliver predefined doses of wet food. For example, U.S. Pat. No. 9,232,769 B1 discloses such a wet food dispenser. The dispenser comprises a food dispensing unit and a several bags of wet food arranged in the upper part of the unit. The food dispensing unit is provided with a casing, a receptacle arranged in the lower part of the casing; an electromechanical device arranged in the middle part of the casing for supplying food from the bags to the receptacle; and means for controlling the electromechanical device. Each bag is attached to the casing from the top and bottom, via top and bottom retaining clips provided on the casing. The electromechanical device comprises a servomotor fitted with a shaft, which in turn is connected to a belt/pulley system. The belt is connected to a mobile arm via a connector which passes through a channel in the casing. The arm, which is fitted with a rotating blade at its free end, is thus driven in translation along the channel by the action of the motorized belt/pulley system. In operation, the arm with its blade cuts through one end of the bags pre-positioned on the casing, enabling wet food to be dispensed into the receptacle. However, a disadvantage of the food dispenser disclosed in this patent document is that it requires a whole bag of wet food to be consumed for each dose of food dispensed. This leads to food waste and overconsumption by the animal, and undermines the device's autonomy. A further disadvantage of such a dispenser is that it cannot guarantee bacteriological and anti-oxidation protection for wet food. This is because the food container and opening mechanism, and even the bags themselves once opened, remain in contact with the air, which carries germs and bacteria that are themselves sources of bacteriological contamination.

The aim of the invention is therefore to provide a bag of wet pet food, which makes it possible to dose a precise quantity of wet food suitable for the animal, and to guarantee a controlled and stable flow of wet food out of the bag.

A further aim of the invention is to provide a bag of wet pet food that guarantees bacteriological and anti-oxidation protection of the wet food.

To achieve these objectives, the invention proposes, according to a first aspect, a bag of wet pet food, intended to be compressed by an assembly for squeezing and/or pressing said bag to ensure the automatic release of at least part of its contents, said bag being formed by two walls connected to each other over a portion of the periphery thereof and defining therebetween a volume for receiving wet food, the two walls not being connected to each other over another portion of the periphery thereof to form a neck for opening the bag, the neck being deformable between at least one open position and one closed position; the walls of the bag comprising, on their internal face, one or more internal weld(s) connecting the walls to each other inside the bag, said internal weld(s) being connected to each other to form, inside the bag, a funnel in fluid communication with the opening neck of the bag.

According to the invention, said opening neck comprises continuous lips, separable from each other to define an opening of said bag for the passage of a portion of its contents, said lips forming a sealed barrier when tension is applied thereto by exerting a pull on at least one of the bag portions located laterally at said opening neck, said neck being configured to present a straight cross-section of different shape for at least two distinct opening positions thereof, one of said opening positions being termed "forced," and corresponding to a circular or substantially circular straight cross-section of said neck, when a push is exerted on this neck, and the ratio between the width (LG) and the height (HG) of said neck, when it allows the passage of said wet food, and when it is at rest, that is, not under tension, is between 1.5 and 10, preferably between 2 and 4 and even more preferably equal to 2.5, so as to ensure a regular flow of said wet food through said neck.

Advantageously, the neck of the bag disclosed above has technical features ensuring a smooth flow of its contents during use, or employment, thereof with a device for dispensing wet food as disclosed above. This avoids, for example, the formation of wet food jets, making it impossible to control the amount of wet food dispensed.

This bag also features at least two "stable opening geometries, or shapes" to allow adjustment to the rheology and/or phase number of the wet food contained therein.

"Stable opening geometry or shape" of the bag neck means that the configuration of the bag neck remains stable over time when constant tension is applied to the portions of the bag located to the side of the opening neck, or conversely, in the absence of such tension.

By way of illustration only, a first of said opening positions corresponding to a stable opening geometry of the neck, the so-called forced opening position, corresponds to a position of said or each block of the wet food dispensing unit with which this bag is intended to be used, wherein it pushes on a corresponding portion of said bag disposed laterally to said neck.

To exert this push, the corresponding block moves toward the neck.

This forced open position corresponds, for example, to a "full-open" neck geometry, and to a circular or substantially circular straight neck cross-section, the latter being reached when the position of said at least one block is closest to said neck.

According to another illustration, another of said opening positions corresponding to a stable opening geometry of the neck, called normal opening position of the bag, corresponds to a position of said or each block, wherein the corresponding portion of said bag arranged laterally to said neck is not tensioned by said block.

For example, this stable opening position corresponds to a neck opening geometry wherein the neck has a straight cat's-eye cross-section.

In addition, such a funnel-shaped configuration enables wet food to be guided efficiently and fluidly toward the bottom of the bag, and in particular toward the neck, which has a narrower diameter. This ensures a controlled, stable flow of wet food from the neck. Additionally, since the neck is deformable between an open position and a closed position, the interior of the neck (and therefore of the bag) remains airtight outside periods of wet food dispensing, due to the closure of the neck. The contents of the opened bag remain air- and bacteria-tight, since the opening surface of the neck is minimal, almost always sealed, with no residues (which fall by gravity). This guarantees effective bacteriological and anti-oxidation protection for wet food. It should also be noted that the bag according to the invention has no gaskets, stoppers or moving attachments, nor is there any residue on the outside; nor is there any suction sucking the air inside the bag: the food is pushed out of the bag, or remains sheltered inside it. The constant upright position of the bag also means that the wet food closes the neck opening and prevents air from entering.

Advantageously, the neck is configured to be opened or closed selectively, by pushing or pulling on at least one edge of the bag or on a portion of the bag positioned laterally to said opening neck.

This pushing or pulling can be carried out, for example, by a motorized gripping element of this portion of the bag placed laterally to said opening neck.

According to an embodiment of the wet pet food bag, the ratio between the height (HE) of the funnel and the width (LG) of said neck, when it allows passage of said wet food, and when it is at rest, that is, not under tension, is greater than 1.5 and preferably greater than 2.

According to another embodiment of the wet pet food bag, the width (LG) of the neck is between 1.5 and 5 cm and the height (HG) of the neck is between 0.5 and 3 cm According to yet another embodiment of the wet pet food bag, the opening neck is shaped to have a substantially elliptical or eye-shaped straight cross-section in another of its opening positions.

According to yet another embodiment of the wet pet food bag, it comprises a valve in the shape of a teat or duck's beak mounted on its neck.

According to yet another embodiment of the wet pet food bag, each wall is formed from at least two layers and comprises at least one inner sheet designed to delimit a portion of the wet food-receiving volume which is made from a food-compatible material, and an outermost layer formed from a film that blocks or absorbs UV rays.

According to yet another embodiment of the wet pet food bag, the walls of the bag are made of a metallic material made of aluminum or an aluminum-based alloy, or of a plastic material made of polypropylene. The use of such a polypropylene material ensures that the bag can be recycled.

By way of illustration, the bag is made from a single plastic material, such as a thermoplastic, advantageously a polyolefin such as polypropylene (PP).

According to yet another embodiment of the wet pet food bag, it has a substantially rectangular or pointed shape in its lower part, or a diamond shape, when laid flat when empty, and the walls of the bag comprise at least two internal welds connecting the walls to each other inside the bag on their internal face in the area of said wet food receiving volume.

Preferably, these internal welds are arranged to form a "V" or a "U", with the internal welds preferably arranged symmetrically around a median longitudinal plane of the bag.

Advantageously, each of these welds extends from a corresponding side edge of the bag to said neck, leaving the portion of the wet food receiving volume located in the upper portion of the bag completely free.

Preferentially, the height h of this free portion, that is, without internal welding of the walls in the receiving volume, is then at least equal to 75% of the height H of the food receiving volume of the bag.

According to yet another embodiment of the wet pet food bag, it comprises two internal welds arranged so as to form a "V" when the bag lies flat and is not filled with wet food, the two internal welds having a symmetrical arrangement around a median longitudinal plane of the bag, each internal weld extending in a direction which forms an angle with the direction corresponding to the length of the rectangle formed by the bag.

Preferably, each of the angles is between 25 degrees and 35 degrees, preferably substantially equal to 30 degrees.

According to yet another embodiment of the wet pet food bag, the bag comprises at least two orifices, and even more preferably at least five orifices, placed in the upper portion of said bag and intended to engage with fastening elements to ensure suspension of said bag.

By way of illustration only, this bag has a substantially rectangular shape when laid flat and not filled with wet food, and the bag is provided with four orifices positioned at the four corners of the rectangle formed by the bag.

Preferably, the shape of each orifice is selected from the group comprising circular, oval, elongated by being curved, elliptical or oblong.

Advantageously, of the two orifices positioned at the upper corners of the rectangle formed by the bag, one of the orifices has an oblong shape, the length of the oblong-shaped orifice being oriented along the width of the rectangle formed by the bag, and the other orifice has a substantially triangular shape. Such orifices thus configured facilitate the installation and holding in position of the bag within a wet food dispensing unit of a device for dispensing food.

According to yet another embodiment of the wet pet food bag, each upper orifice, positioned at an upper corner of the bag, is vertically aligned with a corresponding lower orifice, positioned at a lower corner of the bag, with a lateral variation of plus or minus 1 cm.

According to yet another embodiment of the wet pet food bag, comprising bag portions placed laterally to said neck and on both sides thereof, it is provided with at least two additional orifices placed on both sides of said opening neck.

Advantageously, each of said parts of the bag placed laterally to said neck determines a gripping zone thereof, whose dimension transversely to said bag, or width, is between 2 and 5 cm, and more preferably between 3 and 4 cm, and its height is between 1 and 3 cm, and more preferably equal to about 1 cm.

According to a second aspect, the invention relates to a device for dispensing pet food, this device comprising a casing comprising a food receptacle and a wet food dispensing unit, the wet food dispensing unit being adapted to receive a removable bag of wet food, this wet food dispensing unit being configured to ensure the holding and attachment of said bag so that the latter then extends at least in part along a main axis, said bag being provided with a neck for opening the bag, the neck being deformable between at least an open position and a closed position, being provided on a lower part of the bag and being arranged facing the food receptacle when the bag is received in the wet food dispensing unit, the wet food dispensing unit comprising:

- an electromechanical device for supplying wet food from the bag to the food receptacle, and
- control means for the electromechanical device, capable of controlling the delivery of wet food from the bag to the food receptacle. According to the invention, the electromechanical device comprises:
- at least one block comprising a gripping element for holding a portion of said bag disposed laterally to said neck, said gripping element being mounted for translational movement along an axis that is transverse or substantially transverse to said main axis, and a motor for driving said gripping element in displacement between a position of said portion of said bag held in this way, corresponding to a neck opening position, and a position for pulling said portion of said bag held in this way, corresponding to said neck closing position,
- said blocks being configured to hold a first portion and a second portion of said bag placed laterally to said neck, and located on both sides of the latter, when said electromechanical device comprises two blocks,
- said electromechanical device comprising at least one element for holding a second portion of said bag placed laterally to said neck, when it comprises a single block for gripping a first portion of said bag placed laterally to said neck, said first and second portions being located on both sides of said neck, and
- said blocks, or said block and said retaining element, being configured to allow selective opening or closing of said neck, with tensioning of said first and second portions in the pulling position ensuring tight closure of said neck and thus guaranteeing bacteriological and anti-oxidation protection of the wet food.

The present disclosure advantageously makes it possible to keep the same bag, which has been opened, for longer in the wet food dispensing unit, without altering the quality of its contents. Tests have shown that the same 500-gram bag of wet food (bi-nutrition) can be used for between two (2) and five (5) days at room temperature in the food dispenser, after it has been opened. There is no need to store the bag in a refrigerated compartment after opening.

Preferably, the casing comprises a one-piece, die-cast aluminum shell.

According to a further embodiment of the pet food dispensing device, said electromechanical device also comprises an assembly for squeezing and/or pressing said bag, said assembly defining a main axis along which said assembly for squeezing and/or pressing said bag moves to squeeze and/or press at least a portion of said bag.

Preferably, said bag squeezing and/or pressing assembly comprises two parallel motorized rollers, each of the rollers being mounted for translational movement along said main axis within the casing and extending in a direction transverse to said main axis, the bag being intended to extend between the rollers by being held by squeezing between the rollers when the bag is received in the wet food dispensing unit, the neck of the bag extending below the rollers.

According to a third aspect, the invention also relates to an assembly comprising a pet food dispensing device as described above, and a bag of wet pet food as described above, the bag of wet food being installed within the device and being received in the wet food dispensing unit of the device.

The terms “horizontal”, “vertical” or “transverse”, “lower”, “upper”, “top”, “bottom”, “side” are defined in relation to the orientation of the food dispensing device according to the invention. In particular, in this application, the term “vertical” refers to an orientation perpendicular to the horizon, while the term “horizontal” refers to an orientation parallel to the horizon.

The invention will be described in greater detail by means of non-limiting embodiments, and on the basis of the appended figures, including:

FIG. 1 is a perspective view of an assembly according to the invention comprising a food dispensing device and a bag of wet food, the device comprising a casing inside which the bag of wet food and a food receptacle are installed;

FIG. 2 is a view similar to that of FIG. 1 showing the interior of the casing, and in particular the bag of wet food received in a wet food dispensing unit of the device, in a bag installation configuration, the food receptacle being in the open position, the wet food dispensing unit comprising an electromechanical device for supplying wet food from the bag to the food receptacle, in the form of motorized rollers;

FIG. 3 is a front view of the assembly shown in FIG. 2, with the food receptacle in the closed position;

FIG. 4 is an analogous view to FIG. 2, with the bag of wet food omitted;

FIG. 5 is a perspective view showing a detail of the assembly shown in FIG. 2;

FIG. 6 is a front view of the bag of wet food shown in FIG. 2;

FIG. 7 is a view analogous to that of FIG. 2, in a lowered position of the rollers, the food receptacle being in a closed position, the electromechanical device comprising means for pinching two opposite edges of the bag of wet food;

FIG. 8 is a perspective view of the bag of wet food and the interior of the food dispenser casing shown in FIG. 7;

FIG. 9 is an analogous view to FIG. 7, with the bag of wet food omitted;

FIG. 10 is another perspective view of the assembly of FIG. 9;

FIG. 11 is an analogous view to that of FIG. 8, the bag of wet food having been omitted, the electromechanical device comprising two roller support parts;

FIG. 12 is a side view of one of the roller supports shown in FIG. 11;

FIG. 13 is a perspective view of the pinching means and a lower portion of the bag of wet food of FIG. 7, in a configuration where wet food is not dispensed corresponding to a pulling position of the pinching means; and FIG. 14 is an analogous view to FIG. 13, in a wet food dispensing configuration corresponding to a pushing position of the pinching means.

Figure 15:
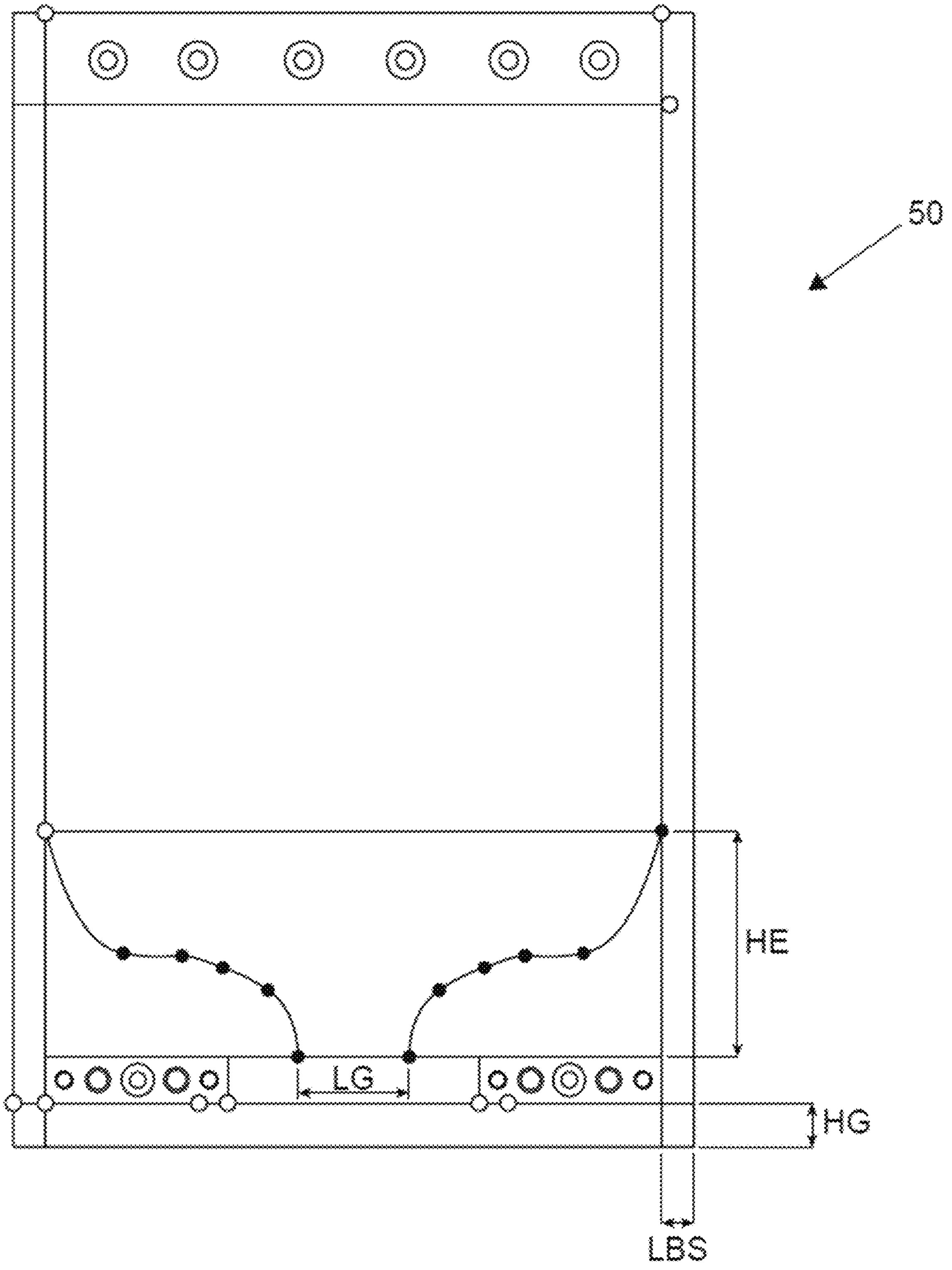
FIG. 15 is a schematic depiction of a bag according to another embodiment of the invention.

FIGS. 1 to 3, 5 and 7 show an assembly 1 comprising a device for dispensing pet food 2 and a bag of wet pet food 4 installed within the device 2. The device 2 is typically designed to dispense food for small pets such as cats or dogs.

The food dispensing device 2 comprises a casing 6, inside which are arranged at least one food receptacle 8A, 8B, a wet food dispensing unit 10, a dry food dispensing unit 12, a scale, a data processing unit and wireless communication means (these last three elements are not shown in the figures for reasons of clarity). Preferably, as shown in FIGS. 1 to 4, 7, 9 and 10, the food receptacle 8A, 8B is arranged inside a drawer 14 movably mounted inside the casing 6, and the food dispensing device 2 further comprises means for controlling the mobile drawer 14 (not shown in the figures for reasons of clarity). Even more preferably, the food dispensing device 2 further comprises a camera 16 connected to the data processing unit and positioned on one side of the casing 6, typically on a front side 18 of the casing 6 (the front side 18 of the casing 6 being defined as the side facing the animal when it wishes to feed). Even more preferably, the food dispensing device 2 further comprises a light or sound indicator 19 to indicate the operation of the device 2, connected to the data processing unit and positioned on one side of the casing 6, typically on the front side 18 of the casing 6. Even more preferably, the food dispensing device 2 further comprises a loudspeaker (not shown in the figures for reasons of clarity), the loudspeaker being connected to the data processing unit and being positioned on one side of the casing 6, typically on the front side 18 of the casing 6. Even more preferably, the food dispensing device 2 further comprises an interface for manual control of the device 2 (not shown in the figures for reasons of clarity), connected to the data processing unit and positioned on one side of the casing 6, typically on an upper side 20 of the casing 6. The food dispensing device 2 further comprises a series of servomotors and sensors which will not be disclosed here in greater detail. As shown in FIGS. 1 to 4 and 7 to 10, the casing 6 is advantageously fitted with a door 21 pivotally mounted on the casing 6 and giving access to the interior of the casing 6 when open.

In the particular embodiment shown in FIGS. 2 and 4, the food dispensing device 2 comprises two food receptacles 8A, 8B, namely a first receptacle 8A for receiving wet food and a second receptacle 8B for receiving dry food. The first food receptacle 8A is arranged opposite the bag of wet food 4. The second food receptacle 8B is arranged opposite the dry food dispensing unit 12 (the latter being a conventional dry food dispensing unit which will not be disclosed in greater detail below, but which includes a dry food reservoir). Dry food includes (but is not limited to) dry kibbles.

Each food receptacle 8A, 8B is, for example, a removable, interchangeable receptacle. The drawer 14 is movably mounted inside the casing 6 between an open position (shown in FIGS. 2 and 4) wherein food is accessible from outside the casing, and a closed position (shown in FIGS. 1, 3, 7, 9 and 10) wherein food is inaccessible from outside the casing 6. The mobile drawer 14, for example, is clipped into an opening in the casing 6. The mobile drawer 14 can thus be unclipped from the casing 6 for easy cleaning of the entire drawer 14. The control means of the mobile drawer 14 are able to control the opening or closing of the mobile drawer 14. In the particular embodiment shown in FIGS. 2 and 4, the mobile drawer 14 also contains another removable crumb catcher-type receptacle 22. Such a "crumb catcher" type receptacle 22 collects wet food residues which may fall from the bag 4 when the mobile drawer 14 is in its open position, or when the mobile drawer 14 is in its translation movement between its open and closed positions. The scale (not shown in the figures), which is for example an electronic scale connected to the data processing unit, is arranged within the mobile drawer 14. Such a scale enables precise measurement of the weight of each dose of wet food dispensed, as well as the weight of wet food consumed by the animal (by difference between the weight of the contents of drawer 14 before and after it has been opened).

The wet food dispensing unit 10 comprises an electromechanical device 24 for supplying wet food from the bag 4 to the first food receptacle 8A; and means for controlling the electromechanical device 24 (not shown in the figures but, for example, connected to or comprising the data processing unit). The control means for the electromechanical device 24 are capable of controlling the delivery of wet food from the bag 4 to the first food receptacle 8A. Wet food includes (but is not limited to) paté food. Preferably, the wet food dispensing unit 10 also comprises means 25 for securing an upper portion of the bag 4 inside the casing 6.

The bag of wet pet food 4 is removably mounted in the food dispensing device 2, and is received in the wet food dispensing unit 10 of the device 2. More precisely, as can be seen in FIGS. 2, 3, 7 and 8, the bag of wet food 4 is held and secured inside the casing 6, in particular via the means 25 for securing the upper portion of the bag 4. The bag 4 is provided with a neck 26 for opening the bag 4, provided on a lower portion of the bag 4. The neck 26 is deformable between an open position (shown in FIG. 14) and a closed position (shown in FIGS. 2, 3, 5, 7, 8 and 13), and is arranged opposite the first food receptacle 8A when the bag 4 is received in the wet food dispensing unit 10. The neck 26 is configured to be selectively opened or closed by pushing or pulling on at least one edge 27A, 27B of the bag 4.

According to a particular embodiment of the invention, shown in FIGS. 2, 3 and 5 to 8, the bag of wet food 4 is formed by two walls (in particular two substantially rectangular walls) joined together over a portion 28A of their periphery 28 and defining therebetween a wet food receiving volume. As shown in FIG. 6, the two walls are not connected to each other at another portion 28B of their periphery 28 and are configured to form the neck 26 for opening the bag 4 at this other portion 28B. The neck 26 thus consists of two lips, each lip forming part of a separate wall of the bag, the two lips being spaced apart in the open position of the neck 26 (visible in FIG. 14), the two lips being in contact with each other and extending parallel to each other in the closed position of the neck 26 (visible in FIGS. 2, 3, 5, 7, 8 and 13). Preferably, as shown in FIG. 14, the neck 26 has an eye-shaped cross-section in its open position. In a variant not shown, the neck 26 has a substantially circular or elliptical cross-section in its open position.

The walls of the bag 4 are for example made of a metallic material made of aluminum or an aluminum-based alloy, or of a plastic material made of polypropylene. The use of such a polypropylene material ensures that the bag 4 can be recycled. The walls of the bag 4 comprise one or more internal welds 30 on their inside, connecting the walls to each other inside the bag 4. Preferably, as shown in FIG. 6, the walls of the bag 4 have two internal welds 30 on their internal face connecting the walls to each other inside the bag 4, the two internal welds 30 being arranged to form a "V" when the bag 4 is laid flat and not filled with wet food. The two internal welds 30 have a symmetrical arrangement around a median longitudinal plane of the bag (such a plane being a vertical plane extending perpendicular to the plane of extension of the rectangle formed by the bag when empty of food), each internal weld 30 extending in a direction D1, D2 which forms an angle a1, a2 with the direction corresponding to the length of the rectangle formed by the bag when empty of food (this direction also being the vertical direction). Preferably, and as shown in FIG. 6, each of the angles a1, a2 is between 25 degrees and 35 degrees, preferably substantially equal to 30 degrees. The internal welds 30 are interconnected to form a funnel 32 inside the bag 4, in fluid communication with the neck 26 of the bag 4. Such a funnel shape enables wet food to be guided efficiently and fluidly toward the bottom of the bag 4, and in particular toward the neck 26, which has a narrower diameter. This ensures a controlled, stable flow of wet food from the neck 26, regardless of the descent height of the rollers 36A, 36B (see below) relative to the bag 4.

As shown in FIG. 6, the bag of wet food 4 is provided with four orifices 34A, 34B, 34C, 34D to enable it to be secured within the wet food dispensing unit 10, inside the casing 6. The four orifices 34A, 34B, 34C, 34D are positioned at the four corners of the rectangle formed by the bag 4 when it is laid flat and empty of food. Two first "top" orifices 34A, 34B are positioned at the top corners of the rectangle formed by the bag 4. One of these orifices 34A has an oblong shape, the length of this orifice 34A being oriented along the width of the rectangle formed by the bag 4. The other orifice 34B, positioned at an upper corner of the rectangle formed by the bag 4, is substantially triangular in shape. Two further "lower" orifices 34C, 34D, typically circular in shape, are positioned at the lower corners of the rectangle formed by the bag 4. Preferably, as shown in FIG. 6, each upper orifice 34A, 34B is vertically aligned with a corresponding lower orifice 34C, 34D, with a lateral variation of plus or minus 1 cm. Each lower orifice 34C, 34D is spaced from the edge of the neck 26 by a distance of, for example, between 2.5 cm and 5.5 cm, preferably substantially equal to 4 cm.

Preferably, as can be seen in FIGS. 3, 5 and 6 in particular, the bag of wet food 4 is provided on its lower portion with a seal 35 to protect the neck 26, projecting downwards below the neck 26. The protective seal 35 hermetically seals the neck 26 before the bag 4 is used, thus preventing any loss of food before it is placed in the device 2. FIGS. 7, 8, 13 and 14 show the bag 4 in use in the device 2 (for dispensing wet food), with the seal 35 previously removed by a user to make the neck 26 functional. The seal 35 is advantageously pre-cut to facilitate tearing by a user.

By way of example, the neck 26 has a length of between 16 mm and 24 mm, preferably substantially 20 mm, after the bag 4 has been opened and the seal 35 torn off. In its closed position, for example, the neck 26 has a width of between 16 mm and 24 mm, preferably substantially equal to 20 mm, the width being measured in the direction of the thickness of the bag 4.

As a further example, when the neck 26 has a substantially circular cross-section in its open position, the diameter of the neck 26 is, for example, between 11 mm and 15 mm, preferably substantially equal to 13 mm.

The electromechanical device 24 comprises means 36A, 36B for squeezing and/or pressing the bag 4, and means 38 for pinching at least one edge 27A, 27B of the bag 4. The electromechanical device 24 further comprises at least one motor or servomotor 40, for example an electric servomotor 40, connected to the pinching means 38 to enable actuation thereof. Preferably, when the squeezing and/or pressing means 36A, 36B are rollers (see below), the electromechanical device 24 further comprises two parts 42 supporting the rollers 36A, 36B, and a further motor or servomotor (not shown in the figures) connected to the rollers 36A, 36B to enable actuation thereof.

The pinching means 38 are mounted so as to be movable between a position in which one of the edges 27A of the bag 4 is pushed toward the neck 26 (such a position corresponding to the opening position of the neck 26 and being shown in FIG. 14), and a position in which the edge 27A of the bag 4 is pulled away from the neck 26 (such a position corresponding to the closing position of the neck 26 and being shown in FIGS. 2, 3, 5, 7, 8 and 13). The pinching means 38 are thus configured to selectively open or close the neck 26 of the bag 4.

In the particular embodiment shown in FIGS. 1 to 14, the pinching means 38 are means for pinching two opposite bottom edges 27A, 27B of the bag 4, and consist of two clamps 38A, 38B. Each clamp 38A, 38B comprises two leaves, one of which is pivotally mounted relative to the other (e.g. by means of a hinge). Each clamp 38A, 38B is configured to pinch one of the lower edges 27A, 27B of the bag 4. The two clamps 38A, 38B are thus arranged on both sides of the neck 26 of the bag 4 when the bag 4 is held by the clamps 38A, 38B. At least one of the two clamps 38A, 38B is connected to the electric servomotor 40 (in the example shown in the figures, the first clamp 38A is connected to the electric servomotor 40). The first clamp 38A is thus mounted for horizontal translation, between the position of pushing the edge 27A of the bag 4 toward the neck 26 and the position of pulling the edge 27A of the bag 4 away from the neck 26, the translational movement of the first clamp 38A lying substantially in the same plane as the plane of extension of the bag 4 when it is empty of food. As shown in FIGS. 3, 8, 10 and 11, each clamp 38A, 38B is provided, for example, on the internal face of one of its leaves with a pin 44A, 44B designed to be inserted into one of the lower orifices 34C, 34D of the bag 4, to enable effective positioning and holding of the bag 4 in the clamp 38A, 38B (which lower orifice 34C, 34D is located on the lower edge 27B, 27A of the bag 4 held by the clamp 38A, 38B in question). Preferably, each clamp 38A, 38B is provided with a means 46 for locking the bag 4 in position in the clamp 38A, 38B, such a means 46 being, for example, a latch for locking the leaves of the clamp.

In the particular example embodiment shown in FIGS. 1 to 14, the means 36A, 36B for squeezing and/or pressing the bag 4 comprise two motorized parallel rollers. Each roller 36A, 36B extends in a direction transverse (preferably perpendicular) to the vertical direction. The bag 4 extends between the rollers 36A, 36B and is held by squeezing between the rollers 36A, 36B, with the neck 26 of the bag 4 extending below the rollers 36A, 36B, facing the first food receptacle 8A. The two parallel rollers 36A, 36B extend in the same horizontal plane when in the bag 4 squeezing position. Motorization of the two rollers 36A, 36B, for example, is achieved via the following arrangement, shown in FIGS. 8 to 12: the ends of each roller 36A, 36B are received in the two support pieces 42, each support piece 42 being mounted for vertical translation on a vertical rail 48. The two support pieces 42 are connected to each other via a horizontal crosspiece 50 running behind the rollers 36A, 36B, each support piece 42 extending in front of the horizontal crosspiece 50. The horizontal crosspiece 50 has a central opening 52 through which a vertical auger 54 can pass. The auger 54 is mechanically connected to the aforementioned servomotor shaft in conjunction with the rollers 36A, 36B. The opening 52 is dimensioned to match the diameter of the auger 54 and is threaded so that its internal thread engages with the thread of the auger 54. In this way, when the servomotor is activated, it rotates the auger 54, which in turn vertically translates the assembly comprising the horizontal crossbar 50, the support parts 42 and the rollers 36A, 36B, this vertical translation movement being performed along the vertical rails 48.

As shown in FIG. 12, each support part 42 comprises a first portion 56 for holding one of the two rollers 36A, and a second portion 58 for holding the other roller 36B. Each support part 42 extends in a substantially vertical plane. The first portion 56 of the support part 42 is configured to form a pivot connection for the roller 36A which it holds. As shown in FIG. 12, the first portion 56 of the part 42 consists, for example, of a circular orifice into which one end of the first roller 36A is inserted. The second portion 58 of the part 42 is provided with an oblong-shaped recess 60 configured to receive, depending on the translational movement of the rollers 36A, 36B in the casing 6, the second roller 36B in a first portion 60A of the recess 60, corresponding to a position in which the rollers 36A, 36B are brought together, or in a second portion 60B of the recess 60, corresponding to a position in which the rollers 36A, 36B are moved apart. Thus, when downward pressure is exerted on the support part 42, for example via the action of the servomotor on the auger 54 (to push the wet food down the bag 4), the second roller 36B moves up into the first portion 60A of the recess 60, from the second portion 60B of this recess 60. This movement brings the second roller 36B closer to the first roller 36A. In the absence of pressure exerted on the support part 42, the second roller 36B falls back into the second portion 60B of the recess 60, causing the rollers 36A, 36B to move apart. The first and second portions 60A, 60B of the oblong-shaped recess 60 are offset from each other vertically and horizontally. The length of the oblong recess 60 can advantageously be oriented along an axis D3 oblique to the vertical direction, in particular along an axis D3 forming an angle a3 with this vertical direction of between 15 and 45 degrees, for example substantially equal to 20 degrees. Each support part 42 is made of a plastic material, for example.

In the particular embodiment shown in the figures, each of the two rollers 36A, 36B is preferably rotatably mounted about its main axis of extension in each of the two support parts 42. Each of the two rollers 36A, 36B, for example, is mounted so as to rotate freely around a rod, which in turn is inserted in each of the two support parts 42.

The means 36A, 36B for squeezing and/or pressing the bag 4 enable the bag 4 to be pressed so that the wet food contained in the bag 4 gradually sinks to the bottom of the bag, thus exerting pressure on the neck 26 of the bag 4 to ensure good flow and a controlled flow of wet food when the neck 26 is in its open position. A linear regression law can advantageously be implemented in the data processing unit to control the movement of the rollers 36A, 36B (profile, speed, pressure, lowered height, etc.), in order to control the flow of wet food and the uniform distribution of doses regardless of the position of the rollers 36A, 36B. The wet food dispensing unit 10 is thus equipped with at least one sensor (connected to the data processing unit, and not shown in the figures) for measuring the vertical position of the rollers 36A, 36B. A slight upward and downward movement of the rollers 36A, 36B (over a very small length compared to the total descent range of the rollers 36A, 36B) may be executed by the control means after each delivery of a dose of wet food. This generates a little slack at the top of the bag 4 to facilitate subsequent dispensing of wet food. The means 38 for pinching at least one edge 27A, 27B of the bag 4 are used to control the opening and closing of the bag 4. Owing to the particular configuration of the wet food bag 4 (and in particular its deformable neck 26), combined with the presence in the electromechanical device 24 of means 36A, 36B for squeezing and/or pressing the bag 4 and means 38 for pinching at least one edge 27A, 27B of the bag 4, the food dispensing device 2 according to the invention thus makes it possible to dose a precise amount of wet food suitable for the animal (and in particular to deliver precise personalized doses of food, typically doses of wet food ranging from 10 g to 100 g).

The means 38 for pinching at least one edge 27A, 27B of the bag 4 thus ensure hermetic (and airtight) closure of the bag 4 when the device 2 is not being used by the animal (and in particular when no animal is recognized by the data processing unit—see below). As a result, the interior of the neck 26 (and therefore of the bag 4) remains airtight outside periods of wet food dispensing, due to the sealing of the neck 26. The contents of the opened bag 4 thus remain air- and bacteria-tight throughout the emptying process, as the opening surface of the neck 26 is minimal, almost always sealed, without residues (which fall by gravity), and inside a fully enclosed machine (no contact with pets or insects). This guarantees effective bacteriological and anti-oxidation protection for wet food.

In the particular embodiment shown in the figures, the means 25 for securing the upper portion of the bag 4 inside the casing 6 consist of a jaw attached in the casing 6. The jaw 25 extends over substantially the entire width of the rectangle formed by the bag 4 and comprises two leaves, one of which is pivotally mounted relative to the other (e.g. by means of a hinge). The jaw 25 is configured to squeeze (or pinch) the upper portion of the bag 4, over substantially its entire width. The jaw 25 is preferentially coated with a rubber strip on its face(s) in contact with the bag 4, such a rubber strip (not visible in the figures) defining, for example, sawtooth-like tangles (not shown) to facilitate squeezing of the bag 4 by the jaw 25.

As shown in FIGS. 3, 8 and 11, the jaw 25 is provided, for example, on the internal face of one of its leaves, with two pins 62A, 62B designed to be inserted respectively into the two upper orifices 34A, 34B of the bag 4, to enable effective positioning and holding of the bag 4 in the jaw 25. For example, two openings corresponding in shape to the pins 62A, 62B (and the two upper orifices 34A, 34B of the bag 4) are provided on the outer leaf of the jaw 25 to allow these pins 62A, 62B to pass through when the jaw 25 is closed. Preferably, the jaw 25 has at least one (and advantageously two in the embodiment example shown in the figures) mean(s) 66 for locking the bag 4 in position in the jaw 25, such means 66 being, for example, a latch for locking the leaves of the jaw 25.

The data processing unit is connected to the control means of the electromechanical device 24 and to the control means of the mobile drawer 14. Alternatively, the data processing unit constitutes such control means. The data processing unit is further connected to the wireless communication means. The data processing unit comprises memory means storing a neural network. The neural network has previously been trained using training data comprising data from at least one database containing animal images (typically cat images). In this way, the data processing unit is able to detect the presence of a predetermined type of animal (e.g. the "cats" type) in front of the food dispensing device 2 (notably by corpulence detection via the camera 16), and thus initiate the food supply sequence. Preferably, the data processing unit is configured in such a way that, each time the neural network recognizes an animal in the field of view of the camera 16 and corresponding to the predetermined type of animal, the data processing unit stores a photo of the animal (taken by the camera 16) in its memory means. Recording such a photo makes it possible to initially inform the pet owner that the pet has been recognized by the device 2, and that the device 2 has therefore triggered food dispensing. In a second phase, anonymized photos of the animals can be used to supply training data to the neural network.

The data processing unit is implemented, for example, in the form of a microcontroller or a Printed Circuit Board (PCB), in which firmware is integrated. The firmware is equipped, for example, with an artificial intelligence module storing the neural network.

The wireless communication means of the device 2 are capable of communicating with a communication device (fixed or mobile) and/or with a remote server, to enable, in particular, the setting of food doses, the manual activation of food dispensing, reporting on the various parameters and monitoring of the parameters. The wireless communication means of the device 2 are thus configured to transmit and/or receive data over a wireless network to and/or from the mobile communication device and/or remote server. The communication device is, for example, a smartphone, a tablet or a computer (without this being restrictive), on which a dedicated web application is installed, to enable remote control of the device 2 and use of the various parameter-setting, reporting and parameter-monitoring functions.

The camera 16 is configured to capture images in front of the casing 6. Preferably, the camera 16 is an infrared camera. The infrared camera 16, for example, is configured to provide a field of view of substantially 120 degrees.

The operating method of the food dispensing device 2, and in particular the wet food dispensing method according to the invention implemented by the wet food dispensing unit 10 of the device 2, will now be described. Initially, a user of the device 2 installs a bag of wet food 4 within the wet food dispensing unit 10, so that the neck 26 of the bag 4 extends opposite the first food receptacle 8A. To do this, the user opens the door 21 of the casing 6, opens the clamps 38A, 38B and the jaw 25, inserts the bag 4 from bottom to top between the rollers 36A, 36B, then adjusts the bag 4 so as to insert the pins 44A, 44B into the lower orifices 34C, 34D and to insert the pins 62A, 62B into the upper orifices 34A, 34B. The user then closes the clamps 38A, 38B and jaw 25, locks the latches 46, 66, and tears the seal 35 off the bag 4. As shown in FIG. 13, the neck 26 of the bag 4 is in its closed position, and the means 38 for gripping at least one edge 27A, 27B of the bag 4 are in the position of pulling the edge 27A away from the neck 26. The user then closes the door 21. Initially, the drawer 14 is in its closed position (shown in FIGS. 1, 3, 7, 9 and 10).

The wet food dispensing method comprises a subsequent step consisting in activating the control means of the electromechanical device 24, to control a dispensing of wet food from the bag 4 to the first food receptacle 8A. This activation of the control means is, for example, performed manually by the user (either via the manual control interface of the device 2, or remotely via his mobile communication device), or is performed automatically by the data processing unit after recognition by the neural network that an animal corresponding to the predetermined type of animal (e.g. a cat) is present in the field of view of the camera 16. In the latter case, the data processing unit stores a photo of the animal (taken by the camera 16) in its memory means.

Activation of the control means of the electromechanical device 24 causes the means 36A, 36B for squeezing and/or pressing the bag 4 and the means 38 for pinching at least one edge 27A, 27B of the bag 4 to move. In particular, at least one of the two clamps 38A, 38B (in this case the first clamp 38A in the example shown in the figures) moves in horizontal translation between the position of pulling the edge 27A of the bag 4 away from the neck 26 (shown in FIG. 13) and the position of pushing the edge 27A of the bag 4 toward the neck 26 (shown in FIG. 14). This movement of the first clamp 38A deforms the neck 26 from its closed position to its open position. The two rollers 36A, 36B then descend vertically inside the casing 6, at a vertical descent pitch. The descent length of the rollers 36A, 36B at this vertical descent pitch is predetermined (e.g. via the implementation of the linear regression law within the data processing unit) and corresponds to the dispensing of a predefined dose of wet food in the first food receptacle 8A. It should be noted that the length of descent of the rollers 36A, 36B according to this vertical descent pitch can therefore vary according to the vertical position of the rollers 36A, 36B in the casing 6.

Once the predefined dose of wet food has been dispensed into the first food container 8A (that is, when the rollers 36A, 36B have completed their vertical downward movement according to the vertical movement pitch), at least one of the two clamps 38A, 38B (in this case, the first clamp 38A in the embodiment example shown in the figures) moves in horizontal translation, between the position of pushing the edge 27A of the bag 4 toward the neck 26 (shown in FIG. 14) and the position of pulling the edge 27A of the bag 4 away from the neck 26 (shown in FIG. 13). This movement of the first clamp 38A deforms the neck 26, which goes from its open position to its closed position. Additionally, the data processing unit activates the control means of the mobile drawer 14, which then controls the movement of the mobile drawer 14 toward its open position (shown in FIGS. 2 and 4). The animal can then access the dose of wet food dispensed. In the invention embodiment of the automatic recognition of the presence of an animal in the field of vision of the camera 16, each dose of wet food is thus extracted from the bag 4 only if an animal corresponding to the predetermined type of animal (e.g. a cat) appears in front of the device 2. If the animal does not finish its dose of wet food, the mobile drawer 14 closes and the dispensed wet food remains protected from oxidation and pollution.

The dispensing of dry food via the device 2 has not been discussed in the context of the method steps detailed above, but such dispensing is of course possible via manual control by the user and/or detection of the animal by the neural network, followed by activation of the dry food dispensing unit 12 to deliver a dose of dry food.

FIG. 15 shows a bag 50 according to another embodiment of the present invention.

This bag 50 has the following parameters:

HU is the “useful height” of the bag, corresponding to the height of the receptacle, measured between the bottom of the top weld of the bag and the top of the neck after the tab has been opened, HL is the free height of the receptacle, measured between the bottom of the top weld of the bag and the start of the internal weld that extends away from the side edges HE is the height of the funnel, measured between the start of the internal weld that runs away from the side edges of the bag and the bottom of the neck after opening.

LG is the width of the neck, measured flat with the bag closed. It is a width, not a diameter.

HG is the height of the neck, measured between the height where the internal welds become parallel to the edges of the bag, and the bottom of the neck after opening.

LBS is the width of the welded strip.

This bag 50 of wet pet food advantageously has values within the following ranges:

LG is between 1.5 and 5 cm

HG is between 0.5 and 3 cm the LG/HG ratio is between 1.5 and 10, preferably between 2 and 4, and even more preferably equal to 2.5, and the HE/LG ratio is greater than 1.5, and preferably greater than 2.

Advantageously, it can be seen that such values for the construction of the bag of wet pet food guarantee even dispensing of the wet food contained in the bag, when the latter is used with the food dispensing device of the invention.

The invention claimed is:

1. A bag of wet pet food, intended to be compressed by an assembly for squeezing and/or pressing said bag to ensure the automatic release of at least part of its contents, said bag being formed by two walls connected to each other over a portion of the periphery thereof and defining therebetween a volume for receiving wet food, the two walls not being connected to each other over another portion of the periphery thereof to form a neck for opening the bag, the neck being deformable between at least one open position and one closed position; the walls of the bag comprising, on their internal face, one or more internal weld(s) connecting the walls to each other inside the bag, said internal weld(s) being connected to each other to form, inside the bag, a funnel in fluid communication with the opening neck of the bag, wherein said opening neck comprises continuous lips, separable from each other to define an opening of said bag for the passage of a portion of its contents, said lips forming a sealed barrier when tension is applied thereto by exerting a pull on at least one of the bag portions located laterally at said opening neck, said neck being configured to present a straight cross-section of different shape for at least two distinct opening positions thereof, one of said opening positions being termed "forced," and corresponding to a circular or substantially circular straight cross-section of said neck, when a push is exerted on this neck, and the ratio between the width (LG) and the height (HG) of said neck, when it allows the passage of said wet food, and when it is at rest, that is, not under tension, is between 1.5 and 10, so as to ensure a regular flow of said wet food through said neck.

2. The bag of wet pet food according to claim 1, wherein the ratio between the height (HE) of the funnel and the width (LG) of said neck, when it allows passage of said wet food, and when it is at rest, that is, not under tension, is greater than 1.5.

3. The bag of wet pet food according to claim 1, wherein the width (LG) of the neck is between 1.5 and 5 cm and the height (HG) of the neck is between 0.5 and 3 cm.

4. The bag of wet pet food according to claim 1, wherein the opening neck is shaped to have a substantially elliptical or eye-shaped straight cross-section in another of its opening positions.

5. The bag of wet pet food according to claim 1, wherein each wall is formed from at least two layers and comprises at least one inner sheet designed to delimit a portion of the wet food-receiving volume and made from a food-compatible material, and an outermost layer formed from a film that blocks or absorbs UV rays.

6. The bag of wet pet food according to claim 1, wherein the bag of wet pet food has a substantially rectangular or pointed shape in its lower part, or a diamond shape, when laid flat when empty, and in that the walls of the bag comprise at least two internal welds connecting the walls to each other inside the bag on their internal face in the area of said wet food receiving volume.

7. The bag of wet pet food according to claim 6, wherein the internal welds are arranged to form a "V" or a "U", with the internal welds arranged symmetrically around a median longitudinal plane of the bag.

8. The bag of wet pet food according to claim 6, wherein each of said welds extends from a corresponding side edge of the bag to said neck, leaving the portion of the wet food receiving volume located in the upper portion of the bag completely free.

9. The bag according to claim 8, wherein the height (h) of this free portion, that is, without internal welding of the walls in the receiving volume, is at least equal to 75% of the height H of the food receiving volume of the bag.

10. The bag of wet pet food according to claim 1, further comprising at least two orifices located in the upper portion of said bag and intended to engage with fastening elements to ensure suspension of said bag.

11. The bag of wet pet food according to claim 10, wherein the shape of each orifice is selected from the group comprising circular, oval, elongated by being curved, elliptical or oblong.

12. The bag of wet pet food according to claim 10, further comprising bag portions placed laterally to said neck and on both sides thereof, it is provided with at least two additional orifices placed on both sides of said neck.

13. The bag of wet pet food according to claim 12, wherein each of said portions of the bag placed laterally to said neck determines a gripping zone thereof, whose dimension transversely to said bag, or width, is between 2 and 5 cm and its height is between 1 and 3 cm.

* * * * *